Patented Sept. 6, 1949

2,481,377

UNITED STATES PATENT OFFICE 2,481,377

HETEROCYCLIC-SUBSTITUTED CARBINOLS

Richard R. Whetstone, Berkeley, Calif., assignor to Shell Development Company, San Francisco, Calif., a corporation of Delaware No Drawing. Application August 23, 1948, Serial No. 45,791

10 Claims. (Cl. 260—333)

This invention relates to new chemical compounds and to a method for their preparation. More particularly, the present invention relates to asymmetrically heterocyclic-substituted carbinols containing in addition to the functional radical of the carbinol group another oxygen-containing functional group. The invention relates especially to new and useful carbinols containing two separate oxygen-containing heterocyclic rings and an extranuclear oxygen-containing functional group other than the hydroxyl of the carbinol group. The invention relates particularly to highly reactive organic compounds which are of value as chemical intermediates, as resin-formers, and more generally as precursors of numerous useful materials.

The novel compounds to which the invention relates and that are embraced within its generic concepts are the heterocyclic-substituted carbinols that may be broadly described and defined by reference to the generic formula

In this generic formula, X represents a dihydropyranyl radical. By the unmodified term "a dihydropyranyl radical" employed in the present specification and claims, it is intended to refer to the dihydropyranyl radicals which have one or more of the hydrogen atoms directly linked to the heterocyclic nucleus substituted by a monovalent hydrocarbon group or by monovalent hydrocarbon groups, respectively, as well as to the unsubstituted dihydropyranyl radical. Y represents a member of the group consisting of (a) the radicals represented by the formulas

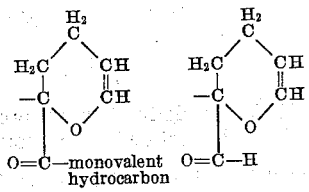

and (b) the radicals depicted by said formulas when hydrogen directly linked to the heterocyclic ring is replaced by monovalent hydrocarbon, and R represents the monovalent hydrogen atom or a hydrocarbon group.

The substituted carbinols represented by the generic formula are characterized inter alia by their chemical reactivity. In part, because of this property, they are valuable as intermediates for the preparation of resins and other high molecular weight polymers. The characteristics of the monomers are such that improved polymeric products are obtained. For example, a preferred compound of the invention, 2-(2-formyl-3,4-dihydro-1,2-pyranyl) 2-(3,4-dihydro-1,2-pyranyl) carbinol, has been found to have properties that make it of particular interest as an intermediate for the preparation of resinous polymers useful, for example, in and as surface-coating compositions. Hardened films containing the polymerized monomer have an excellent lustre and an outstanding resistance to attack by organic solvents. The hardened films of polymers of this compound have an unusually good resistance to attack by alkalies and acids. Films prepared from or containing the polymers therefore may be used with advantage as improved decorative and/or protective coatings. The stated compound, and its suitable substitution products resulting from replacement of one or more of the nuclear hydrogen atoms by hydrocarbon groups, e. g., alkyl groups, may be polymerized in the presence of acid with polyhydric alcohols, such as glycols, glycerol and sugar alcohols, to form useful resinous and sub-resinous polymers which in the fully hardened, i. e., cross-linked, state may be employed for the fabrication of various articles of manufacture.

Another valuable group of compounds of the invention comprises the ketonic heterocyclic carbinols represented by 2-(2-acetyl-3,4-dihydro-1,2-pyranyl) 2-(3,4-dihydro-1,2-pyranyl) carbinol and its nuclear hydrocarbyl-substitution products. These ketonic heterocyclic carbinols, due to their unique structure, may be employed as intermediates for the preparation of biologically active compounds. For example, they may be halogenated to produce useful saturated halogen-containing derivatives which may be employed to combat insects and other pests. Their oximes also are of potential interest as biologically active materials.

By converting the formyl and the ketonic acyl group of the foregoing compounds to a carbinol group, there are obtained valuable dihydric

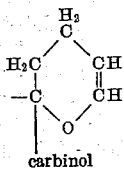
carbinol heterocyclic alcohols represented by 2-(2-methylol-3,4-dihydro-1,2-pyranyl) 2-(3,4-dihydro-1,2-pyranyl) carbinol and its substitution products resulting from replacement of one or more of the nuclear hydrogen atoms and up to one of the hydrogen atoms on the carbon atom of the methylol group by hydrocarbon radicals. These heterocyclic dihydric alcohols are valuable as intermediates for special solvents and plasticizers. When the nuclear unsaturation is eliminated, as by saturation of the olefinic bonds with hydrogen, stable high molecular weight alcohols are obtained which, as such or in the form of esters with suitable carboxylic acids, have properties admirably adapted to use as blending agents in resinous compositions and as softening agents for cellulose esters and ethers.

Typical other compounds within the scope of the invention and illustrating the invention in both its generic and its subgeneric concepts, are referred to in the following paragraphs.

It has been indicated that, in addition to the foregoing specific carbinols, the invention includes related compounds resulting from replacement by one or more hydrocarbon groups of hydrogen atoms bonded to carbon atoms of the respective heterocyclic nuclei. Broadly speaking, the substituent hydrocarbon group or groups may be any suitable hydrocarbon group or groups. The unqualified expression "hydrocarbon group" is intended to include both the open-chain and the cyclic hydrocarbon groups, and is not intended to be limited according to the presence or absence of carbon-to-carbon unsaturation. Suitable hydrocarbon groups include alkyl, aryl, alkaryl, aralkyl, cycloalkyl, as well as the unsaturated aliphatic and cycloaliphatic hydrocarbon groups. The hydrocarbon groups preferably are devoid of aliphatic unsaturation, i. e., they desirably are non-olefinic and non-acetylenic. More specifically, the hydrocarbon groups, if any, linked to the carbon atoms of the respective heterocyclic nuclei preferably are selected from the class composed of the alkyl, aryl, aralkyl, alkaryl, and cycloalkyl radicals. Although the hydrocarbon groups which may be present may contain from one to as many as twenty carbon atoms, preferred compounds are those which contain, if any, nuclear hydrocarbyl substituent groups of from one to eight carbon atoms. Representative compounds contemplated as within the generic concepts of the invention may contain hydrocarbon substituent groups represented by, among others, the following: methyl, ethyl, propyl, isopropyl, hexyl, octyl, cyclopropyl, cyclohexyl, octadecyl, vinyl, allyl, amyl, phenyl, lauryl, fenchyl, menthyl, ethynyl, cyclopentenyl, styryl, phenethyl, acenaphthenyl, carvacryl, chaulmoogryl, crotyl, cyclohexadienyl, and analogs and homologs thereof. Hydrocarbon groups attached to the nuclei of the substituted carbinols of the invention may be the same or different. Because of the greater ease with which they may be prepared and purified, and because of their especially desirable characteristics, preferred compounds are the hereinbefore specifically enumerated products and the related products wherein one or more of the nuclear hydrogen atoms has or have been replaced by lower alkyl groups, e. g., alkyl groups containing from one to eight carbon atoms, including methyl, ethyl, propyl, butyl, amyl, hexyl, heptyl and octyl and the branched chain alkyl groups isomeric thereto.

It is considered that a valuable group of compounds may be represented by the generic formula

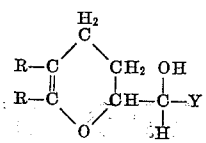

in which each R represents a hydrogen atom or a hydrocarbon group as hereinbefore explained, and Y has its above-stated significance. An especially valuable subgeneric group of compounds is obtained when carbon atoms in positions Nos. 2, 3, and 4 of the heterocyclic ring of the radical denoted by Y are substituted by hydrogen atoms only.

Valuable substituted carbinols of the invention which contain a formyl group as the additional oxygen-containing functional group, may be represented more specifically by the formula

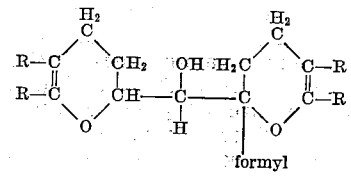

in which R has its previously explained significance. As illustrative compounds having structures corresponding to this formula there may be mentioned the following:

2-(2-formyl-3,4-dihydro-1,2-pyranyl) 2-(3,4-dihydro-1,2-pyranyl) carbinol 2-(2-formyl-5-methyl-3,4-dihydro-1,2-pyranyl) 2-(3,4-dihydro-1,2-pyranyl) carbinol 2-(2-formyl-5-methyl-3,4-dihydro-1,2-pyranyl) 2-(5-methyl-3,4-dihydro-1,2-pyranyl) carbinol 2-(2-formyl-3,4-dihydro-1,2-pyranyl) 2-(5-methyl-3,4-dihydro-1,2-pyranyl) carbinol 2-(2-formyl-5,6-dimethyl-3,4-dihydro-1,2-pyranyl) 2-(5,6-diethyl-3,4-dihydro-1,2-pyranyl) carbinol 2-(2-formyl-5,6-diethyl-3,4-dihydro-1,2-pyranyl) 2-(5,6-diethyl-3,4-dihydro-1,2-pyranyl) carbinol 2-(2-formyl-6-methyl-3,4-dihydro-1,2-pyranyl) 2-(6-methyl-3,4-dihydro-1,2-pyranyl) carbinol A further valuable subgeneric group of compounds embraces the ketonic heterocyclic carbinols having the subgeneric formula

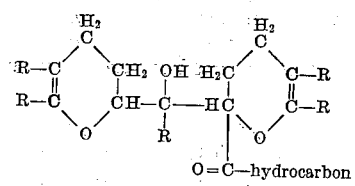

in which R is as defined hereinabove. This formula includes the following compounds:

2-(2-acetyl-3,4-dihydro-1,2-pyranyl) 2-(3,4-dihydro-1,2-pyranyl) carbinol 2-(2-acetyl-6-methyl-3,4-dihydro-1,2-pyranyl) 2-(6-methyl-3,4-dihydro-1,2-pyranyl) carbinol 2-(2-acetyl-6-methyl-3,4-dihydro-1,2-pyranyl) 2-(3,4-dihydro-1,2-pyranyl) carbinol 2-(2-propionyl-6-ethyl-3,4-dihydro-1,2-pyranyl) 2-(6-methyl-3,4-dihydro-1,2-pyranyl) methyl carbinol 2-(2-acetyl-6-methyl-3,4-dihydro-1,2-pyranyl)

2-(6-methyl-3,4-dihydro-1,2-pyranyl) methyl carbinol

Further valuable carbinols of the invention have structures represented by the formula

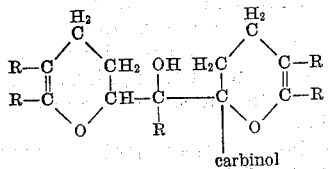
carbinol

This formula includes the following heterocyclic-substituted carbinols:

2-(2-methylol-3,4-dihydro-1,2-pyranyl) 2-(3,4-dihydro-1,2-pyranyl) carbinol 2-(2-methylol-5,6-dimethyl-3,4-dihydro-1,2-pyranyl) 2-(3,4-dihydro-1,2-pyranyl) carbinol 2-(2-methylol-6-ethyl-3,4-dihydro-1,2-pyranyl) 2-(6-ethyl-3,4-dihydro-1,2-pyranyl) carbinol 2-(2-methylol-5-methyl-3,4-dihydro-1,2-pyranyl) 2-(3,4-dihydro-1,2-pyranyl) carbinol as well as the compounds:

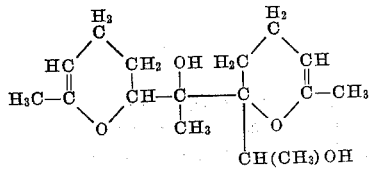

and

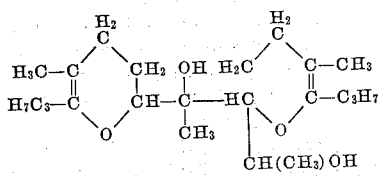

The novel aldehyde- and keto-carbinols of the invention as a group may be prepared by condensing suitable acyl-substituted dihydropyrans in the presence of water under neutral to alkaline conditions of reaction. The condensation may be accomplished by mixing the acyl-substituted dihydropyran with a suitable amount of water, in the presence of a basic condensation catalyst, and maintaining the mixture at a suitable reaction temperature. After the reaction has proceded to the desired extent, the condensation product may be recovered from the mixture in any suitable manner.

The acyl-substituted dihydropyrans which may be employed as reactants for the preparation of the substituted carbinols of the invention are those which contain an acyl substituent at the carbon atom in the No. 2 position of the dihydropyran ring, and which may have hydrocarbon radicals attached to the other carbon atoms of the heterocyclic ring, or which may be otherwise unsubstituted. Suitable acyl-substituted dihydropyrans may be represented by the formula

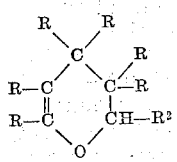

in which R represents hydrogen or hydrocarbon and $R^2$ indicates acyl. Preferred substituted dihydropyrans are those in which the carbon atoms in positions Nos. 3 and 4 of the heterocyclic ring are unsubstituted except by hydrogen, i. e., the 2-acyl-3,4-dihydro-1,2-pyrans and their 5- and/or 6-hydrocarbyl substitution products. Suitable substituted dihydropyrans which may be condensed according to the process of the invention include, for example, 2-formyl-3,4-dihydro-1,2-pyran, 2-formyl-5-methyl-3,4-dihydro-1,2-pyran, 2-acetyl-6-methyl-3,4-dihydro-1,2-pyran, 2-propionyl-3,4-dihydro-1,2-pyran, 2-benzoyl-3,4-dihydro-1,2-pyran, 2-formyl-5-ethyl-3,4-dihydro-1,2-pyran, and their homologs and their analogs. The acyl-substituted dihydropyrans may be prepared in any suitable manner, as by condensing by heating one or more conjugated vinyl aldehyde and ketones (alpha,beta-olefinic aldehydes and ketones) in the liquid state, preferably at about 150° C. to about 250° C., in the presence of a polymerization inhibitor or by ring closure of suitable aliphatic substituted aldehydes or ketones. One or a plurality of the acyl-substituted dihydropyrans may be employed in accordance with the process of the invention.

Basic condensation catalysts which may be used to accelerate the condensation of the acyl-substituted dihydropyrans preferably are those water-soluble substances which impart alkalinity to water, the inorganic bases and alkaline salts being especially suitable. The caustic alkalies, such as the alkali metal hydroxides and carbonates, and the alkaline earth metal hydroxides, are eminently satisfactory. Sodium hydroxide, potassium hydroxide, lithium hydroxide, caesium hydroxide, sodium carbonate, potassium carbonate, calcium hydroxide, barium hydroxide and even strontium hydroxide may be mentioned as suitable alkalies, the alkali metal hydroxides being preferred. Basic-reacting salts may be employed as the condensation catalyst. Suitable salts include, for example, sodium acetate, sodium bicarbonate, trisodium phosphate, trisodium citrate, sodium borate, etc. The condensation catalyst is employed in aqueous solutions. Solutions of the catalyst having a concentration from about 0.005 gram-equivalents per liter to about 5 gram-equivalents per liter may be used in the general case. A preferred range of concentrations is from about 0.005 to about .5 gram-equivalent per liter.

According to the process of the invention, the condensation of the acyl-substituted dihydropyrans is carried out in the presence of water. It is essential to employ such an amount of water that the desired reaction occurs, but under the reaction conditions to avoid the presence of water in amounts that would lead to deleterious side reactions or to the formation of undesired polymers. The amount of water may be varied from about 1 mole to about 100 moles per mole of the acyl-substituted dihydropyran. A preferred range is from about 10 moles to about 75 moles of water per mole of the substituted dihydropyran. More particularly, when an aqueous solution containing from about 0.005 to about .2 equivalent per liter of a caustic hydroxide is employed, amounts of the solution containing from about 10 to about 50 moles of water per mole of the substituted dihydropyran may be employed with eminently satisfactory yields of and conversions to the desired condensation product.

The acyl-substituted dihydropyrans employed in the process of the invention are potentially capable of reacting with or in the presence of water to form various products other than those desired in accordance with the invention. Thus, reaction at the nuclear olefinic bond may occur to form hydrates of the acyl-substituted dihydropyrans. In fact, even the heterocyclic ring of the acyl-substituted dihydropyrans is prone to hydrolysis, such hydrolysis or opening of the ring forming acyclic products quite unlike the products desired in accordance with the invention. It has been unexpectedly discovered in accordance with the present invention that the occurrence of these and other possible undesired side reactions may be substantially avoided by conducting the condensation of the acyl-substituted dihydropyrans in the presence of water and a basic condensation catalyst, as aforesaid. The basic condensation catalyst appears to have not only an activating effect upon the desired reaction, but also to have an inhibiting or restraining influence upon undesired side reactions, since in its absence the acyl-substituted dihydropyrans employed in the process of the invention tend to react to form predominantly products other than the desired substituted carbinols.

The desired condensation reactions occur at any suitable temperature above about 0° C., up to a temperature that causes undesired polymerization of the organic reactant or other reactions in excessive amounts. Temperatures of from about 10° C. to about 75° C. may be used advantageously. The desired condensation of the acyl-substituted dihydropyrans employed in the process of the invention may be effected efficiently at or about ordinary room temperatures (20° C. to 40° C.), with the advantage that necessity for means to cool and/or heat the reacting mixture is obviated.

As an illustration of the products and process of the invention, 2-formyl-3,4-dihydro-1,2-pyran was mixed at about 25° C. with about 4.5 times its weight of water containing in solution 2.5 grams (.0625 mole) of sodium hydroxide per liter. After a few minutes, insoluble material began to separate from the mixture, and after 30 minutes the characteristic odor of the formyldihydropyran could not be detected. The water was decanted from the insoluble material and the latter was dissolved in ether-benzene mixture. The solution was washed with water and then distilled under about 2 millimeters mercury pressure to a kettle temperature of 100° C., thereby removing the solvents, any remaining water, and other low-boiling materials. The remaining residue amounted to 72% by weight on the amount of formyl-dihydropyran employed. It was a light yellow viscous liquid, shown by analysis to consist essentially of the desired product 2-(2-formyl-3,4-dihydro-1,2-pyranyl) 2-(3,4-dihydro-1,2-pyranyl) carbinol of the structure

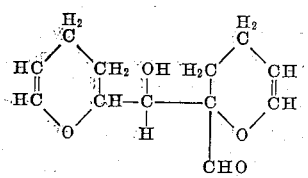

In this experiment, the bromine number of the product (grams bromine absorbed per 100 grams) was found to be 140 compared to a theoretical value of 143. The molecular weight of the sample was found to be 243 (ebulliometric in benzene) compared to a value of 224 for $C_{12}H_{16}O_4$. The slightly high value found for the molecular weight undoubtedly was due to the presence of a small amount of higher condensation products, probably formed by polymerization of the product. This likelihood was borne out by the noted tendency of the product to increase in viscosity upon standing, indicating spontaneous polymerization.

When the foregoing condensation was effected in saturated aqueous sodium carbonate solution at room temperature, the insoluble product formed almost immediately. In saturated aqueous sodium bicarbonate solution, the formation of the insoluble product was less rapid, about 90 minutes being required for substantial completion of the condensation.

As a further illustration of the invention, 2-acetyl-6-methyl-3,4-dihydro-1,2-pyran may be mixed at about room temperature with a dilute aqueous solution of potassium hydroxide, and the mixture warmed to about 40° C. After the reaction has occurred, the product is worked up in the manner employed in the preceding example. The desired product is found to be 2-(2-acetyl-6-methyl-3,4-dihydro-1,2-pyranyl) 2-(6-methyl-3,4-dihydro-1,2-pyranyl) methyl carbinol, of the structure

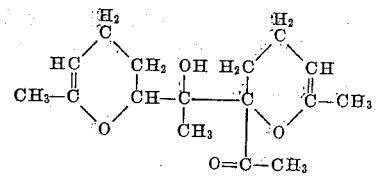

As indicated by the foregoing experiments, the condensation of the acyl-substituted dihydropyrans to form the desired products may be carried out by mixing with water in a suitable amount, in the presence of a basic condensation catalyst, and allowing the mixture to stand for a suitable time. The mixture may be prepared by mixing the ingredients in any order. After the reaction has occurred, the products may be recovered and/or purified in any desired manner. Methods of recovery and purification which are suggested include distillation, for example, so-called "molecular distillation," crystallization from solvents, adsorption, treatment with selective solvents, etc.

As chemical intermediates, the carbinols of the invention are versatile and useful. For example, 2-(2-formyl-3,4-dihydro-1,2-pyranyl) 2-(3,4-dihydro-1,2-pyranyl) carbinol may be hydrogenated to the saturated dihydroxylic compound 2-(2-methyloltetrahydropyranyl) 2-tetrahydropyranyl carbinol which may be used as a plasticizer and as a special solvent. By treatment with water in the presence of acid and catalytically activated hydrogen, the 2-(2-formyl-3,4-dihydro-1,2-pyranyl) 2-(3,4-dihydro-1,2-pyranyl) carbinol may be converted to novel polyhydric alcohols, such as 5-methylol-1,5,6,7,11-hendecanepentol and 7-methylol-1,5,6,11-hendecanetetrol. Esters of these polyhydric alcohols with drying oil acids have desirable and improved properties for use in surface-coating compositions, e. g., paints and varnishes.

Having described the invention in various of its specific and generic embodiments, it will be apparent that modifications in detail thereof may be made by those skilled in the art without departing from the letter and spirit of the invention as it is defined in the hereto appended claims.

I claim as my invention:

1. 2-(2-formyl-3,4-dihydro-1,2-pyranyl 2-(3,4-dihydro-1,2-pyranyl) carbinol.

2. 2-(2-acetyl-6-methyl-3,4-dihydro-1,2-pyranyl) 2-(6-methyl-3,4-dihydro-1,2-pyranyl) methyl carbinol.

3. 2-(2-methylol-3,4-dihydro-1,2-pyranyl) 2-(3,4-dihydro-1,2-pyranyl) carbinol.

4. Carbinols of the structure

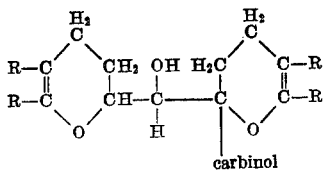

in which each R represents a member of the group consisting of hydrogen and monovalent hydrocarbon.

5. Carbinols of the structure

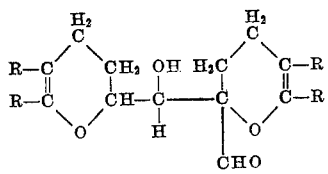

in which each R represents a member of the group consisting of hydrogen and monovalent hydrocarbon.

6. Carbinols of the structure

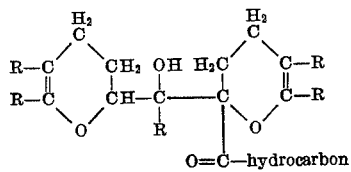

in which each R represents a member of the group consisting of hydrogen and monovalent hydrocarbon.

7. Carbinols of the structure

in which X represents a dihydropyranyl radical, Y represents a member of the group consisting of (a) the radicals represented by the formulas

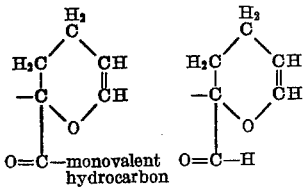

and

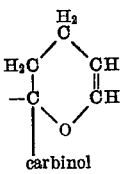

and (b) the radicals depicted by said formulas when hydrogen directly linked to the heterocyclic ring is replaced by monovalent hydrocarbon, and R represents a radical selected from the group consisting of hydrogen and monovalent hydrocarbon.

8. A process of preparing 2-(2-formyl-3,4-dihydro-1,2-pyranyl) 2-(3,4-dihydro-1,2-pyranyl) carbinol which comprises mixing 2-formyl-3,4-dihydro-1,2-pyran with an approximately 0.0625 N aqueous solution of sodium hydroxide at about 25° C., separating insoluble product from the mixture, and heating the separated insoluble product to remove volatiles boiling below the boiling point of said 2-(2-formyl-3,4-dihydro-1,2-pyranyl) 2-(3,4-dihydro-1,2-pyranyl) carbinol.

9. A process of preparing 2-(2-formyl-3,4-dihydro-1,2-pyranyl) 2-(3,4-dihydro-1,2-pyranyl) carbinol which comprises condensing 2-formyl-3,4-dihydro-1,2-pyran in an aqueous solution of an alkali at a temperature from about 10° C. to about 75° C.

10. A process of preparing a heterocyclic-substituted carbinol which comprises condensing an acyl-substituted dihydropyran having an acyl group in position No. 2 of the dihydropyran ring in an aqueous solution of an alkali at a temperature of from about 10° C. to about 75° C.

RICHARD R. WHETSTONE.

No references cited.